United States Patent Office 3,455,168
Patented July 15, 1969

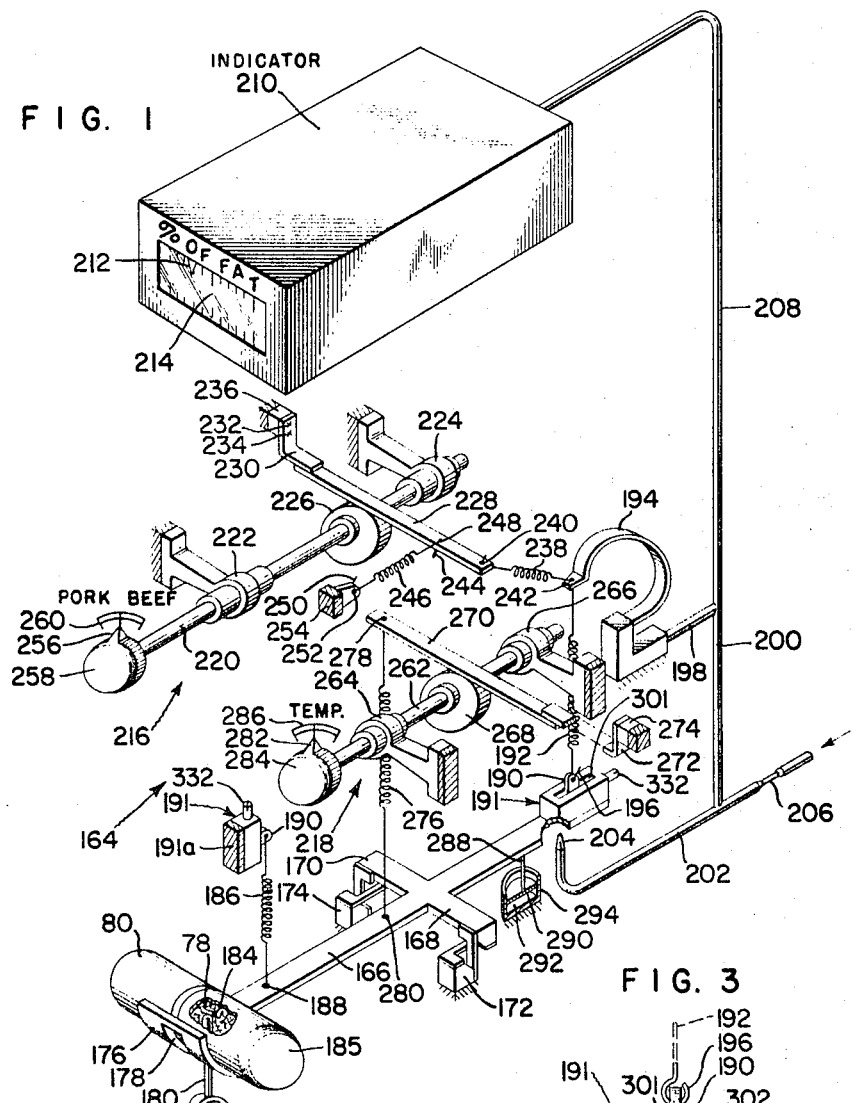

3,455,168
APPARATUS FOR MEASURING FAT CONTENT OF ANIMAL TISSUE
William S. Taylor, Drexel Hill, and Robert C. Whitehead, Jr., Oreland, Pa., assignors to Honeywell Inc., Minneapolis, Minn., a corporation of Delaware
Original application Feb. 7, 1964, Ser. No. 343,270, now Patent No. 3,282,115. Divided and this application Mar. 22, 1966, Ser. No. 536,387
Int. Cl. G01d 7/00
U.S. Cl. 73—432                                   7 Claims

ABSTRACT OF THE DISCLOSURE

An apparatus for measuring the percentage of fat in animal tissue is employed that has an adjustable first means to produce a first variable in accordance with the volume of the animal tissue, a second means responsive to the weight of the animal tissue to produce a second variable and a third means responsive to the magnitude of the first and second variables to produce a third variable that is representative of the percent of fat in the animal tissue.

---

This is a divisional application, Ser. No. 343,270, filed Feb. 7, 1964, and now issued as the W. S. Taylor et al., U.S. Patent No. 3,282,115.

It is an object of the present invention to disclose an apparatus for measuring the percentage of fat in a mixture.

Recent public health programs have made us all aware of the harmful, overworked heart condition that is brought about when we consume too great a quantity of fat. Thus, it has become imparative that food processors keep the consumers of their products informed of the precise amount of polysaturated, polyunsaturated or other types of fats and associated carbohydrates that are contained in the food products that they manufacture.

It is also imperative that the food processor maintains the percentage of fat in the food that he is manufacturing at a substantially-fixed level so that the high quality taste and uniform consistency of this product will be maintained throughout the entire manufacturing process and subsequent processes.

Prior to the present disclosure, it had been the practice, when a chemist desired to take a fat measurement of a food product, to first take a small sample of this food product from the food process unit. The sample was then taken to his laboratory where he added chemical and/or heat to the food sample in order to allow the fat to be poured in liquid form into a calibrated graduate so that the volume of the fat in the food product sample could be observed.

It is another object of the present invention to provide an apparatus that will enable a manufacturer of any product containing fat to guarantee to a consumer of his product a greater degree of accuracy in the fat content of his product than has heretofore been possible.

It is another object of the present invention to provide a way of utilizing, to a greater extent than has heretofore been possible, the maximum amount of fat that a manufacturer is permitted by law to introduce into his product without altering the high quality, taste and appetizing color appearance of his product.

It is another object of the present invention to employ an apparatus for more accurately and rapidly measuring the fat in food products than is possible when the aforementioned, time-consuming, quantitative analysis that is involved in the addition of chemicals and heat to the food product sample is used.

It is still another object of the present invention to provide a fat-weighing means with an adjustable, dial-actuated linkage to apply a first selected magnitude of input force thereto in accordance with the temperature of the food product whose fat content is being measured.

It is another object of the present invention to provide the aforementioned fat-weighing apparatus with an adjustable, dial-actuated linkage to apply a second, selected magnitude of input force thereto in accordance with the characteristic physical ingredients that are contained in the food product whose fat content is being measured by this apparatus.

More specifically, it is another object of the invention to provide a unitary, weight-measuring apparatus containing the aforementioned temperature and food ingredient correcting dial-actuating linkage, which apparatus may be adjusted to measure the percent of fat in, e.g. any one of a number of meat-fat mixtures such as is present in animal tissue.

A better understanding of the present invention may be had from the following detailed description when read in connection with the accompanying drawings in which:

FIGURE 1 shows an apparatus for weighing the aforementioned fatty materials in their compressed state and thereby indicating the percentage of fat therein;

FIGURE 2 shows a spring force adjusting unit that can be used to advantage in the measuring apparatus shown in FIGURE 1 when any one of a number of different volumes of a material containing fat are employed therewith and, FIGURE 3 is a sectional view taken along the line 3—3 of FIGURE 2.

FIGURE 1 shows a gob of material 78, whose fat content is to be determined, located within a container 80. This gob of material may be animal tissue and may be, e.g. either a known volume of a chunk of meat or a known volume of ground meat in a compressed state that is placed in a container 80. This volume is determined by any one of the several types of fluid-actuated piston units disclosed in the aforementioned patent application Ser. No. 343,270 filed Feb. 7, 1964, now issued as U.S. Patent 3,282,115.

FIGURE 1 shows an apparatus 164 for indicating the percentage of fat that is present in any one of a variety of materials containing fat, e.g. a pork or beef mix.

The fat-indicating apparatus 164 is comprised of a force balance beam 166 having two integral side portions 168, 170 extending therefrom that are, in turn, respectively mounted for rotation about the associated cross spring pivots 172, 174.

The left end of the force balance beam 166 has an integral, arcuate, saddle member 176 extending therefrom. An aperture in the form of a rectangular slot is formed by a central wall portion 178 of the member 176. A temperature-sensing probe 180 extending from a temperature indicator 182 is shown having a temperature-sensing end 184 protruding through the slot 178 into the material 78 in the container 80 whose fat content is to be measured. As previously mentioned, the material 78 contains fatty ingredients therein which are in a compacted state.

The right end of the container 80 is shown containing a pipe plug and cap unit 185 to retain the material within the container 80 in the compressed deaerated state in which it had been placed by the apparatus disclosed in the aforementioned application Ser. No. 343,270, filed Feb. 7, 1964.

A suppnession spring 186 is shown having one end fixedly attached by braising material at 188 for movement with the beam 166 and its other hooked and fixedly connected to a lug 190 which is, in turn, adjustably fixed to an adjustable volume unit 191 to be later described that has a stationary left side portion 191a. The purpose of the suppression spring 186 is to perform the function of balancing out the dead weight of the beam 166 and the chamber 80 plus a part of the weight of the material 78 within the chamber 80.

The weight of the material for any given sample of animal tissue, for example beef, within the chamber 80 will be at a minimum level when zero percent of fat is present therein and the weight of any sample of compressed animal tissue placed in chamber 80 will decrease as its fat content is increased towards a one hundred percent value. The amount of fat that is present in animal tissue, has a definite relation to the part of the animal from which this animal tissue is taken. The weight of the material within the chamber 80 for any given sample is balanced by the spring 192 and bourdon 194 to which one end of this spring 192 is attached. The other end 196 of the spring 192 is of a hook-shaped construction which, in turn, is fixed to a lug 190 which is connected by an adadjustable volume unit 191 to the right end of beam 166, to be described later.

The bourdon 194 is shown connected by way of passageways 198, 200 to the fluid under pressure in chamber 202. The pressure in the bourdon will thus be increased when a force is applied to move the underside surface of the beam 166 toward the nozzle 204, and the pressure in the chamber 202 and bourdon will be decreased when a force is applied to the beam 166 to move it away from the nozzle 204.

A fluid pressure generating source, not shown, is used to supply a fluid pressure to the aforementioned chamber 202 in the direction of the arrow and through the restriction 206. The upper branch end 208 of the fluid passageway 200 is connected to a pneumatically-actuated indicator 210 to move a pointer 212 along a scale 214. This construction will enable the viewer to see an accurate measurement of the percent of fat that is present in the material 78 that is present in the container 80. The pointer 212 of the indicator scale 214 can be moved by any commercially-available, pneumatically-actuated bellows or a series of stacked diaphragm capsules that is employed to actuate a linkage, not shown, that extends between either of these actuating means and the pointer 212.

The aforementioned, described, fat-indicating apparatus is unique in that it employs two, separately-operated, adjustable type, spring-loaded biased units 216, 218 for respectively altering the force applied to the force balance beam 166 in accordance with the physical characteristics of the ingredients of the compressed material in the container 80 and in accordance with the temperature of this material.

By way of illustration, FIGURE 1 shows the adjustable spring-biased unit 216 as being comprised of a rotatable shaft 220 which is rotatably mounted in stationary pillow bearing block support members 222 and 224. Fixedly mounted on the shaft 220 between the bearing members 222 and 224 there is shown a cam 226.

The central lower surface of the cantilever beam 228 is shown in physical surface-to-surface contact with the top surface of the cam 226. A flexible L-shaped pivot member 230 which forms an integral left end portion of the cantilever beam 228 is fixedly connected by a braising material 232, 234, as shown, to a stationary member 236 as shown in FIGURE 1.

A spring 238 is shown fixedly connected at one of its ends by a braising material 240 to the right end of the cantilever beam 228 and connected by suitable braising material 242 at its other end to the free end of the bourdon 194.

The right hooked end 244 of another spring 246 is shown extending through a wall portion 248 in the cantilever beam 228 that forms an aperture therein. The other hooked end 250 of the spring 246 protrudes through and into contact with a wall portion 252 forming an aperture in stationary member 254. The spring 246 will thus retain the underside of the cantilever beam 228 in physical contact with the cam 226 regardless of the change in position of the free end of the bourdon 194 and spring 238.

From the foregoing description, it can be seen that clockwise rotation of the pointer 256 and its associated knob 258, that is fixedly mounted on the left end of the shaft 220, will cause the radial distance between the center of the shaft 220 and the outer periphery of the cam 226, that is in contact with the cantilever beam 228, to be reduced.

In a similar, but opposite, manner it can be seen that counterclockwise rotation of the knob 258 will cause the aforementioned radial distance between the center of the shaft 220 and the undersurface of the cantilever beam 228 to be raised from the position shown.

Adjustment of the beam 228 in the aforementioned manner will thus alter the angle at which the left end of the spring 238 is displaced with respect to the point at which the braising material 242 joins the other end of this spring to the free end of the bourdon 194. It can also be seen that adjustment of the knob 258 in the aforementioned manner will also cause the length of this spring 238 to be altered. The change in angular position and the change in length of the spring 238 will thus cause the characteristic force that the bourdon 194 per se applies to be altered for each different position of the knob.

By way of an example, it can be seen that when the pointer 256 is positioned at the left end of the scale 260, a characterized biasing force will be introduced into the force-balance beam 166 of the weighing apparatus 164 that will enable it to directly measure the fat content in pork or some other similar characterized, compressed, fatty material 78 that is selected for insertion in the container 80.

When the pointer 256 of the knob 253 is aligned with the right end of the indicating scale 260, then it will enable the apparatus to directly measure the fat content of beef or some other similar, characterized, compressed, fatty material that is selected for insertion in the container 80.

FIGURE 1 also shows the previously-referred-to, spring-biased unit 218 for altering the force applied to the force balance beam 166 in accordance with the temperature of the meat in the container 80, as is indicated on the gage 182.

This spring-biased unit 218 is comprised of a shaft 262 rotatably mounted in stationary pillow bearing block support members 264, 266. Fixedly mounted on the shaft 262 between the bearing members 264, 266 there is shown a cam 268.

The aforementioned adjustments are necessary because for example different food products will have different weight characteristics for any preselected volume.

It has also been discovered that a fatty food product such as animal tissue will have different fat to weight characteristics for a preselected volume for different parts of the animal from which this animal tissue is taken. Because of the existence of these different protein-fat combinations it is therefore necessary to provide an adjustment by means of knob 258 for these differences in physical characteristics.

The central lower surface of the cantilever beam 270 is shown in physical surface-to-surface contact with the top surface of the cam 268.

A flexible L-shaped pivot member 272 which forms an integral right end of the cantilever beam 270 is fixedly connected by a braising material, not shown, to the stationary member 274.

A spring 276 is shown fixedly connected at one of its ends by braising material 278 to the left end of the cantilever beam 270 and connected by a suitable braising material 280 at its other end to the force-balance beam 166.

From the aforementioned description, it can be seen that clockwise rotation of the pointer 282 and its associated knob 284 that is fixedly mounted on the left end of the shaft 262 will cause the radial distance between the center of the shaft 262 and the outer periphery of the cam 268 that is in contact with the cantilever beam 270 to be reduced. In a similar, but opposite, manner it can also be seen that counterclockwise rotation of the knob 258 will cause the aforementioned radial distance between the center of the shaft 262 and the undersurface of the cantilever beam 270 to be raised from the position shown in FIGURE 4. Thus, the pointer 282 or knob 284 is rotated to the temperature value on the temperature-indicating scale 286 shown on gage 182 so that the correct force can be applied to the beam for the temperature of the material under measurement.

FIGURE 1 also shows a piston rod 288 having an upper end fixedly connected by a braising material, not shown, to the underside of the force balance beam 166 and a lower end which has a piston 290 integral therewith which is mounted for movement in fluid 292 which is retained in a dash pot 294.

Common linear relation exists between the specific gravity of the fat content of different samples of, e.g. pork, containing minced ham, shoulder pork trim which includes bellies, etc. and jowles.

Each of the two previously-described adjustable volume units 191 employed in the fat-indicating apparatus of FIGURE 1 is shown in detail in FIGURES 2 and 3. Each of these units 191 has the bottom portion of the previously-described lugs 190 passing through a slotted wall portion 301 which is integral with a nut 302 as shown in FIGURE 3.

The nut 302 is shown threadedly mounted for movement along an adjustable screw shaft 304. The nut 302 also has indicating pointers 306, 308 integral therewith that are in slidable contact with portions of an integrally-connected base plate 310, 312 of the unit 191.

The unit 191, in turn, is fixedly mounted to the stationary plate 191a in one instance and to the top right end surface of the beam 166 in the other instance, as shown in FIGURE 1. The surfaces 314, 316 on either side of the base plate 312 have volume indicating scales inscribed thereon which correspond to the volume of the material 78.

The bottom nut 302 is slidably mounted for movement along the upper base surface of the base plate 310. The base plate 310, in turn, has two side plates 318, 320 integral therewith. The plate 318 has a circular wall portion 322 which forms an aperture therein for rotatably supporting the right non-threaded end portions 324 of the screw shaft 304 which, in turn, has a peened end 326.

It can also be seen that, in FIGURE 2 of the drawing, the plate 320 also has a circular wall portion 328 therein for rotatably supporting the left non-threaded end 330 of the screw shaft 304.

It can be seen from the aforementioned description that the knurled knob 332 of the screw shaft 330 can be rotated in a clockwise or counterclockwise manner so that the nut 302 and the pointers 306, 308 can be adjusted in either direction from the position shown to any desired value along the volume scales 314, 316 to the value of the compressed material 78. A wall surface 317 is shown forming an aperture in the side wall of the unit 191.

When an increased volume adjustment from that shown is desired, the knob 332 of one of the adjustable volume units 191 is rotated so that the lug 190 will move the end of the spring 186 in an upward direction from that shown in FIGURE 4 so as to alter the magnitude of the force that the spring 186 can apply to the left end of the beam 166. When making this volume adjustment, the lug 190 of the other unit 191 is also positioned to the desired volume setting on scale 314, 316 to the right of the position shown along the beam 166 so as to alter the magnitude of the characterized force that the spring 192 can apply to the beam 166.

It should also be understood that the knob 332 is rotated to make the nut 302 and lug 190 move in the opposite direction from the position shown in FIGURE 1 when a decreased volume adjustment is desired.

It can thus be seen that an apparatus is employed to take any one of a number of compacted random sample volumes of a material containing fat such as animal tissue that has been substantially deaerated, and to make corrections for the physical characteristics of the compressed ingredients as well as for the temperature and volume of these ingredients so that an accurate measurement of the fat content of different types of materials such as animal tissues can be obtained.

What is claimed is:

1. An apparatus for measuring the fat content in a compressed meat sample, comprising a force balance weighing unit adapted to have forces applied thereto and means responsive to said forces, a mechanically adjusted means operably connected to the weighing unit for applying an unbalancing force thereto that is proportional to the volume of the compressed meat sample, said weighing unit being operably connected to support the compressed meat sample thereon and to have applied thereto another unbalancing force equal to the weight of said meat sample, said responsive means being operable to produce a force in opposition to the unbalancing forces being applied to said weighing unit and being operable to return the weighing unit to a substantially predetermined balance condition, and an indicating means operably associated with said responsive means to indicate the fat content in said compressed meat sample.

2. The appartus as specified in claim 1, wherein the weighing unit is comprised of a force balance beam, a means is employed to measure the temperature of the meat sample and a manually adjustable spring-biased means is employed to alter the force applied to the weighing unit in accordance with the magnitude of change occurring in the temperature of the meat sample.

3. The apparatus as specified in claim 1, wherein the weighing unit is comprised of a force balance beam, and a manually adjustable spring-biased means is employed for applying a force to the weighing unit whose magnitude is varied in accordance with the physical characteristics of the non-fat ingredients of the meat sample at the selected portion of the animal from which said sample is selected.

4. The apparatus disclosed by claim 1, wherein the weighing unit is comprised of a force balance beam, a first tension spring connected at one end to one portion of the force balance beam and at its other end to the free end of a first cantilever beam to apply a force to said force balance beam, a second tension spring connected to another portion of the force balance beam and to a movable end of a distensible member, a second cantilever beam, a third tension spring connected at its respective ends to the second cantiliver beam and the movable end of said distensible member to apply a force to said force balance beam, a separate adjustably-rotated cam in physical contact with each cantilever beam and operably connected to vary the position of the free end of each of the last-mentioned beams and thereby alter the magnitude of the force that is transmitted by the respective first and third springs to the movable end of the distensible member and the force balance beam associated with the other ends of the respective springs, and a means operably connected to the distensible member and being responsive to the movement of the force balance beam to change the position of the movable end of the distensible member in a direction that will alter the force that the third tension spring applies to the last-mentioned beam.

5. An apparatus to measure the percent of the fat in a compact meat sample, comprising an adjustable first means operable to produce a first variable unbalancing force whose magnitude is varied in accordance with the volume of the compacted meat sample, a second means responsive to the weight of the compacted meat sample to produce a second variable unbalancing force, means operably connected to restore said unbalancing forces to a balanced condition, said restoring means including a third means that is operably responsive to the magnitude of the first and second variables to produce a third variable force whose magnitude is representative of the percent of fat in the meat sample.

6. The apparatus defined in claim 5 wherein a means is employed to measure the temparture of the meat sample and a manually adjusted temperature compensating means is operably connected to alter the magnitude of the third variable in accordance with the magnitude of the temperature measurement whenever the magnitude of the temperature of the meat sample being sensed by the temperature measuring means is altered to thereby nullify the adverse effect that a change in temperature would otherwise have on the measurement of the percent of fat in the meat sample.

7. The apparatus defined in claim 5 wherein the third means is responsive to the magnitude of a fourth means whose magnitude is varied in accordance with the kind of animal and the location within the animal from which said meat sample is derived.

References Cited

UNITED STATES PATENTS

| | | | |
|---|---|---|---|
| 1,800,532 | 4/1931 | Howard | 73—433 X |
| 2,687,037 | 8/1954 | Saxe | 73—433 |
| 1,205,986 | 11/1916 | Gipe et al. | 73—433 |

RICHARD C. QUEISSER, Primary Examiner

J. P. BEAUCHAMP, Assistant Examiner

U.S. Cl. X.R.

73—32, 433